Sept. 1, 1925.
A. C. McWILLIAMS ET AL
METER TERMINAL AND TESTING DEVICE
Filed Jan. 25, 1922    2 Sheets-Sheet 1
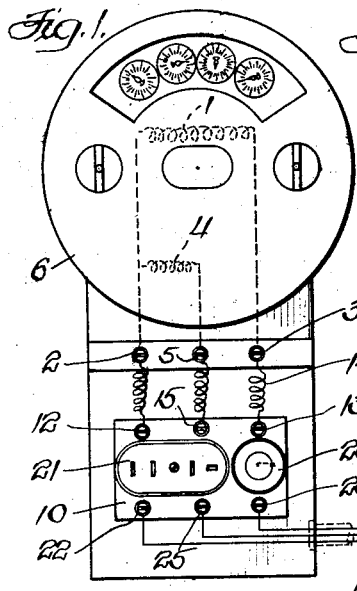
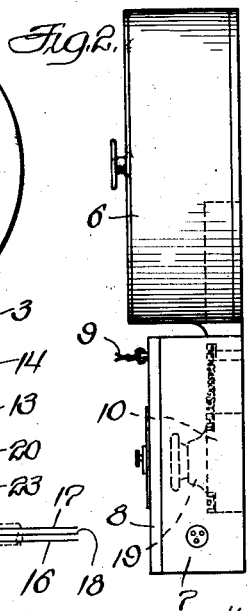
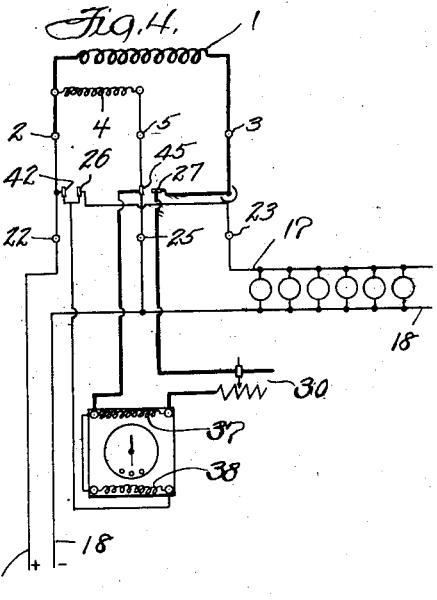
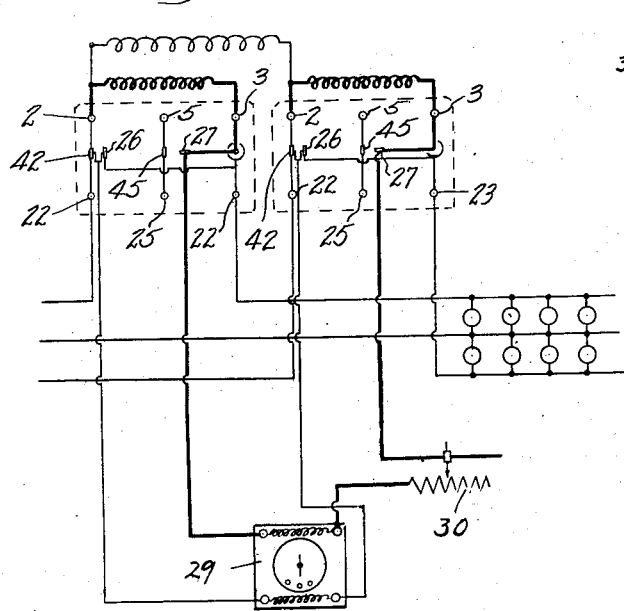
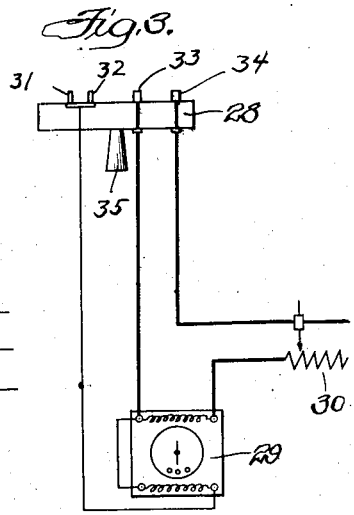
Inventors:
Arthur C. McWilliams
and Jean S. Jenson
By Albert Scheible, atty.

Sept. 1, 1925. 1,551,579
A. C. McWILLIAMS ET AL
METER TERMINAL AND TESTING DEVICE
Filed Jan. 25, 1922 2 Sheets-Sheet 2
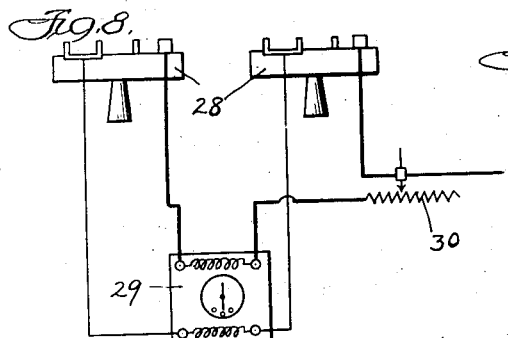
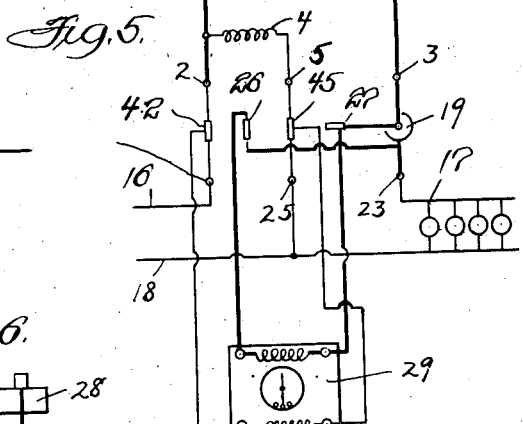
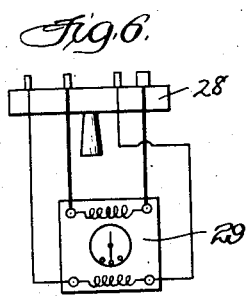
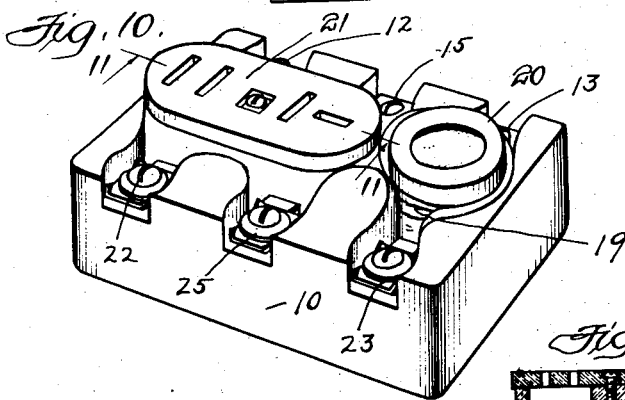
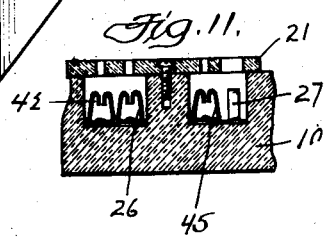
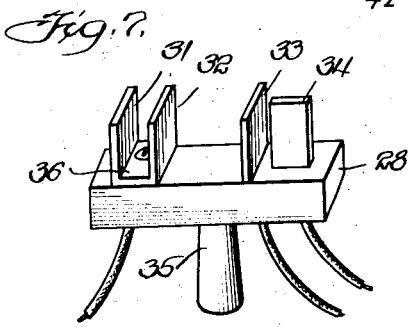
Inventors:
Arthur C. McWilliams
and Jean S. Jenson
Albert Scheible, Atty.

Patented Sept. 1, 1925.

1,551,579

UNITED STATES PATENT OFFICE.

ARTHUR C. McWILLIAMS AND JEAN S. JENSON, OF CHICAGO, ILLINOIS, ASSIGNORS TO ALLIED ENGINEERS, OF CHICAGO, ILLINOIS, A PARTNERSHIP CONSISTING OF ARTHUR C. McWILLIAMS, JEAN S. JENSON, G. G. FORNOFF, CHARLES A. NELSON, W. C. DUNCON, AND THEODORE VLADIMIROFF.

METER TERMINAL AND TESTING DEVICE.

Application filed January 25, 1922. Serial No. 531,606.

*To all whom it may concern:*

Be it known that we, ARTHUR C. McWILLIAMS and JEAN S. JENSON, both residing at Chicago, Cook County, Illinois, and both citizens of the United States, have invented certain new and useful Improvements in a Meter Terminal and Testing Device; and we do hereby declare the following to be a full, clear, and exact description of the invention, such as will enable others skilled in the art to which it appertains to make and use the same.

Our invention relates to meter testing and protecting devices, and in some of its general objects aims to provide a simple, safe, inexpensive and fool-proof device which will facilitate the proper connecting of the meter to the service wires, which will afford added fusible protection for the meter, which will permit the ordinary meter-testing connections to be made instantly and without disconnecting or detaching any wires, and which will permit the meter to be tested on an artificial load without interrupting the customer's service.

In one of its general aspects, our invention aims to provide a meter terminal block affording the needed through connections between the service wires and the wires leading to the meter and also affording added fuse protection, and aims to equip this terminal block with simple and effective provisions arranged for affording simultaneous connection to a group of wire terminals carried by a detachable plug and connected to a portable meter testing outfit. It also aims to arrange the cooperating connections for this purpose so that the inserting of the plug to afford the testing connections will not interrupt the consumption circuit in connection with which the meter is used, and so that this consumption circuit can be interrupted (if desired) by merely detaching the meter protecting fuse.

Furthermore, it aims to provide a combined meter terminal, fuse carrier and test-connection attaching block in an inexpensive and convenient form having a row of service terminals along one edge arranged for connection to the service wires and having a corresponding row of meter terminals at its opposite edge for attachment to the corresponding wires leading to the meter, thereby facilitating the wiring and avoiding any likelihood of a mistake in the connections. Furthermore, it aims to provide such a terminal block with contact members adapted to afford all of the regularly needed connections to the terminal carrier of a testing outfit without employing any switching members or other movable members (other than a movable circuit-closer which may be in a form of a detachable fuse carrier associated with one wire of the meter) either on this stationary terminal block or on the said terminal carrier. So also, it aims to provide a simple, inexpensive and easily manipulated terminal carrier suited for such a purpose and aims to arrange both this carrier and the stationary block so that the carrier cannot be attached in any wrong position and so that the counterpart terminal carriers can readily be employed with counterpart stationary terminal blocks for affording a variety of testing connections.

Furthermore, our invention aims to provide a stationary terminal carrier of the general class described which can readily be mounted in a suitable housing and which will leave no live conductors exposed when the meter is not set, thereby avoiding accidental short circuits or grounds. It also aims to provide a device of the class described arranged so that it can readily be sealed in a suitable casing to prevent tampering with any of its connections, and so that the terminals of the meter itself can readily be housed by the same casing to prevent a theft of current. Moreover, our invention aims to provide a suitably positioned casing for this purpose which will compel the terminal carrier of the testing set to be removed before the casing can be closed and which will house all of the electric terminals of the stationary meter connection block as well as those of the meter itself so as to prevent tampering of any kind.

More particularly, our invention aims to provide a meter test connection block normally affording the usual three connections to the meter and a fusible protection for the customer's circuit, and having three contact clips respectively connected to the three meter terminals, as well as a fourth contact clip electrically connected to the line terminal associated with the fuse of the block. Then it aims to provide a terminal carrier having two contacts respectively adapted to engage two of the said contact clips and having a pair of interconnected contacts adapted respectively to engage the said fourth contact clip and the other one of the first named three contact clips.

It also aims to provide such meter terminal blocks and corresponding gang plugs in a form equally suitable for use singly with one another in testing a two-wire three-point meter installation, and for use in the form of two duplicate pairs in testing a three-wire four-point meter installation. Furthermore, it aims to provide a meter terminal block of the class described which can also be employed with equal advantage in testing meters of less common types, such as the Sangamo meter, by employing slightly altered gang plugs, and which can be used in connection with three-wire meter installations by employing similar gang plugs having no two of their contact plugs directly connected to each other. Still further and also more detailed objects will appear from the following specification and from the accompanying drawings, in which Fig. 1 is an elevation of a meter installation showing a recording wattmeter as connected to a meter test block embodying our invention, the said test block being disposed within a casing which also houses the terminals on the meter itself so as to prevent access to the latter.

Fig. 2 is a side elevation of the same installation.

Fig. 3 is a diagrammatic view showing a gang plug suitable for instantaneous attachment to the test block of Fig. 1 and connected both to a rotating standard and to a portable test load.

Fig. 4 is a diagram showing the electrical connections resulting from the applying of the test set of Fig. 3 to the meter installation of Fig. 1 for testing the meter on the portable test load.

Fig. 5 is a similar diagram showing the connections when the same gang block and rotating standard are employed for testing the meter on the customer's load.

Fig. 6 is a diagram showing the connections of the gang plug to the rotating standard as employed for the purpose illustrated in Fig. 5.

Fig. 7 is a perspective view of the gang plug employed in Figs. 3 and 4.

Fig. 8 is a diagram showing the connections of two such gang plugs to a rotating standard and an artificial load so as to form a six-terminal testing set.

Fig. 9 is a diagram showing the duplex or six terminal testing set of Fig. 8 as used in testing a three-wire four-point meter on a portable test load.

Fig. 10 is a perspective view of the test block used singly in Figs. 1, 2, and 5, and used in duplex in Fig. 9.

Fig. 11 is a fragmentary central, longitudinal and vertical section through the test block showing the arrangement of the contact clips.

In the embodiment of the drawings, Figs. 1 and 2 show a recording wattmeter having a load coil 1 spanning the outer meter terminals 2 and 3 and having a potential coil 4 connected between the load terminal 2 and a potential terminal 5, the latter being disposed between the terminals 2 and 3 in accordance with the usual custom. Housing the said terminals 2, 5, and 3, so as to prevent access thereto by anyone who might desire to secure current from the circuit without having this current metered is a casing 7 which desirably is disposed closely adjacent to the meter 6 but so arranged that the meter itself can be bodily removed or replaced when desired, access to the connections within the casing 7 being afforded by a door 8 which is normally guarded by a seal 9.

Within the casing 7 we fasten the terminal block having a base 10 (desirably made of porcelain) supporting three wire terminals 12, 15, and 13 respectively opposite the meter terminals 2, 5, and 3 so that each of the latter can readily be connected by a short wire (such as the wire 14) to the test block terminal opposite the same. Mounted on the test block 10 near the opposite edge to the aforesaid test block terminals and desirably in vertical alinement respectively with the latter are three circuit terminals 22, 25, and 23 to which the circuit connections are made in the same order as if they were led directly to the terminals 2, 5, and 3 of the meter. That is to say, the terminals 22 and 23 are respectively connected to one of the service wires 16 and to the load wire 17 which is in series with the latter through the load coil of the meter, while the terminal 25 is connected to the circuit wire 18 which forms the other load wire. Then the test block is provided with two conductors one of which forms a permanent electrical connection between the test block terminals 12 and 22 while the other affords a similar permanent connection between the terminals 15 and 25. The terminals 13 and 23 are respectively connected to the two terminals of a fusible receptacle 19 so that they may be connected during the ordinary operation of the circuit through the fuse in a detachable fuse plug 20, the fusible receptacle being employed as a convenient means for affording a separable connection which is normally closed by the detachable fuse plug.

The test block 10 also carries four contact clips, each of which is designed for affording electrical connection to a contact tip on a gang plug and to which clips access is afforded through suitably disposed apertures in an insulating cover 21 which houses the said clips. Two of these clips, namely the clips 42 and 45 are respectively connected to the terminals 22 and 25 from which a continuous electrical connection is afforded to the two terminals of the potential coil of the meter. The other two clips 26 and 27 are respectively connected to the circuit side and the meter side of the separable connection which is here shown as including a fusible receptacle, and the clip 26 connected to the consumption circuit side of the latter is preferably disposed adjacent to the clip 42 which is connected to the load wire 16, namely the load wire in series with the load coil of the meter. Thus arranged, the conductors on the test block afford two direct and continuous through connections respectively from one load wire and from the circuit wire of opposite polarity, and afford a connection to the other load and circuit wire which is bridged by the fuse and is adapted to be ruptured by detaching the fuse.

To cooperate with the test block as thus arranged and connected, we employ a gang plug 28 which for its most common uses is directly connected to a rotating standard 29 and to a portable test load 30 by suitable wires arranged as shown in Fig. 3. This gang plug has four contact tips, namely a pair of tips 31 and 32 respectively disposed for engaging the clips 42 and 26 and continuously connected to each other by a cross-bar 36. It also has two additional contact tips 33 and 34 respectively adapted to engage the clips 45 and 27. The gang plug has a suitable handle 35 by means of which it may readily be manipulated and has its contact tips so disposed that all four of the same may be simultaneously inserted through the apertures in the cap 21 for affording the said electrical connections. When the plug is thus attached, it will be evident from Fig. 4 that the interconnected tips 31 and 32 will afford a direct connection from the load wire 16 to the corresponding wire of the circuit, thus effectively by-passing the current coil of the meter. It will also be evident that on removing the fuse plug 20, the wire 17 of the circuit will be electrically disconnected from the load coil of the meter, but this load coil will still be left in series with the test load 30 and with the load coil 37 of the rotating standard, while the potential coil 38 of this standard will afford a corresponding connection across the two load wires of the circuit. Consequently, the testing set when thus applied will readily afford a check on the accuracy of the meter.

The test block installation as above described can also be employed with equal convenience for testing three-wire four-point meters. For this latter purpose, we employ two test blocks each arranged exactly as heretofore described and connect the same in the manner shown in Fig. 9 so that the terminal 22 of the two test blocks respectively are connected to the outer load wires of the circuit, while the terminals 23 of the two blocks are respectively connected to the outer circuit wires. In this case, no connection whatever is made to the middle terminals 25 of the two blocks and the test set is connected to two duplicates of the gang plug as heretofore described, the connections being made as shown in Fig. 8, thereby affording the operative connections of Fig. 9 when the two gang plugs are applied to the pair of test blocks.

In either case, it will be evident that the installation of our test plugs can easily be made even by an inexperienced wireman, who merely needs to remember that the fuse of the block should be at the right hand of the latter when the installation is to be in connection with meters as now in common use. By arranging the blocks so that the corresponding terminals will then be opposite the regular meter terminals and arranged in the same order in which the circuit connections are commonly made direct to the meter, we avoid all puzzling and any likelihood of errors in the installation. When the block has been installed the mere insertion of the gang plug followed by the removal of the fuse, or in other words by opening the separable connection provided in one conductor, automatically affords all the needed connections, thereby avoiding the chance of errors and likewise avoiding the need of attaching or detaching any wires, jumpers or the like, such as would demand the services of an experienced electrician. The testing of the meters can therefore readily be performed by anyone who has been trained to read the dial of the rotating standard and to adjust the test load if necessary and can be accomplished both quickly and without the use of pliers, screwdrivers or other tools. Furthermore, no harm can ensue in case the meter tester should forget to manipulate the fuse plug properly. Should he fail to detach the same when applying his gang plug, attention will be called immediately by his failure to secure the reading on his rotating standard. Should he fail to replace the plug after making his test, he would merely leave the customer's circuit disconnected from the service without doing any other harm and the service connection can instantly be restored by replacing the fuse, but if he replaces the fuse plug before detaching the gang plug he can make the needed test without interrupting the customer's service.

Moreover, the use of the simple and convenient arranged meter terminal and test block as above described need not be limited to the testing of meters on portable test loads, as the same block in exactly the same connection could be employed with equal facility for testing the meter on the customer's load, by merely rupturing the electrical connection between the tips 31 and 32 of the gang plug. If this connection is omitted, and if the two contact tips are then connected to the rotating standard as shown in Fig. 6, the applying of the gang plug to the test block will afford the connections shown in Fig. 5, thus instantly permitting the testing of the meter to be made on the customer's load.

Since the fuse plug 20 merely acts as an easily detachable switching member, the electrical connection between its terminals can be made non-fusible if desired, but we have referred to it as made by a fuse which will aid in protecting the meter against overloads. In either case, by removing this plug and then locking the casing the customer's service will be shut off, so that our simple test block also serves as a convenient means for making such a disconnection when desired.

In practice, we desirably arrange the gang plug and the contact clips so that the plug cannot be used in any wrong position, as for example by the illustrated expedient of turning one of the tips 34 at right angles to the other tips. We also desirably make the casing 7 of such a size that the door of the same cannot be closed when the plug is in position, thereby preventing a careless tester from accidentally leaving the plug attached. In constructing the needed test block we may employ a construction similar in many respects to that of ordinary three-wire fuse blocks, as for example after the manner shown in Fig. 10. However, while we have illustrated and described our invention in certain highly desirable embodiments and applications, we do not wish to be limited to the use of a receptacle and fuse plug for affording the needed separable connection, nor to others of the details of the construction, arrangement or use thus disclosed, it being obvious that the same might be varied in many ways without departing either from the spirit of our invention or from the appended claims.

We claim as our invention:—

1. A meter test block for a meter with three terminal connections embodying two conducting members thereon affording through connection from the line wires respectively to the common terminal of the two meter coils and to the potential coil terminal of the meter, a third conducting member affording connection through a detachable fuse from the load to the separate current coil terminal of the meter, and four contact clips respectively associated with the first named two conducting members and with the fuse-connected parts of the third conducting member, the contact clip associated with the load side of the third member being disposed adjacent to the contact clip associated with the conducting member connected to the common terminal; in combination with a gang plug having a pair of electrically connected fingers arranged respectively for engaging the said adjacent clips and having two other fingers arranged respectively for engaging the clips associated with the said potential coil terminal and with the meter side of the said third conducting member.

2. A meter test block for a meter with three terminal connections embodying two conducting members thereon affording through connection from the service wires respectively to one load terminal and to the potential coil terminal of the meter, a third conducting member affording connection through a detachable fuse from the load to the other load terminal of the meter, three contact clips associated respectively with the first named two conducting members and with the circuit side of the third conducting member; and a gang plug having three fingers respectively adapted to engage the said three contact clips; the test block and the gang plug having cooperating means for by-passing the current coil of the meter when the said three fingers are in engaging relation to the said clips, the by-passing means comprising a fourth contact clip connected to the load side of the said third conducting member and a double-fingered conductor arranged for simultaneously engaging the said fourth contact clip and the contact clip associated with the conducting member leading to the first named load terminal.

3. A meter test block for a meter with three terminal connections embodying two conducting members thereon affording connections from the line wires respectively to the common terminal of both meter coils and to the separate potential coil terminal of the meter, a third conducting member affording a connection through a separable connection from the load to the separate current coil terminal of the meter; three contact clips associated respectively with the first named two conducting members and with the meter side of the said separable connection; and a gang plug having three contact members each having a finger adapted to engage one of the said three contact clips; and means for by-passing the current coil of the meter when the said three fingers are in engaging relation to the said clips, the said means comprising a fourth contact clip connected to the load side of the said separable connection, and a double-fingered conductor carried by the plug and arranged for simultaneously engaging the said fourth contact clip and the contact clip associated with the conducting member leading to the said common terminal, the last named conductor having one of the aforesaid three fingers as a part thereof.

4. A meter test block embodying three contact clips respectively connected to the usual three terminals of a meter, a movable conducting element disposed between one side of the load and the contact clip connected to the corresponding meter load terminal, the said element being adapted when moved from its normal position to rupture the connection between the said meter load terminal and the said side of the load, and a fourth contact clip connected to the same load side on the opposite side of the said conducting element from the last named contact clip, and a gang plug arranged for simultaneously making test connections to the three meter terminals and by-passing the current coil of the meter.

5. A meter test block comprising three contact clips respectively connected to the three terminals of a meter, means affording a separable connection between one side of the load and the contact clip connected to the corresponding meter load terminal, and a fourth contact clip connected to the same load side on the opposite side of the separable connection from the last named contact clip; in combination with a gang plug arranged for simultaneously making test connections to the three meter terminals and for cooperating with the fourth contact clip in by-passing the current coil of the meter.

6. A meter test block comprising a refractory base, three meter terminals mounted thereon respectively opposite three circuit terminals, the middle circuit terminal being connected jointly to one side of the supply circuit and one side of the load; a fuse receptacle on the block electrically disposed between the other load terminal and the meter terminal opposite thereto; a removable fuse in the said receptacle; a pair of plug sockets respectively disposed between the other pairs of opposed terminals and each having a pair of contact clips one of which is connected to the terminals between which the socket is disposed; the other contact clips being connected respectively with the two terminals of the fuse receptacle, in combination with a gang plug having four fingers arranged for simultaneously engaging the said four contact clips respectively, and electrical connections from the said fingers to a portable test load and a rotating standard or wattmeter.

7. A meter terminal and testing appliance for use with a meter having a single line terminal and having two other terminals respectively at the load ends of the current and potential coils, comprising one member having a contact element associated with the said line terminal, a second contact element associated with the load end of the potential coil, a conductor leading to the load end of the load coil and having a separable connection therein, and third and fourth contact elements associated with the said conductor at opposite sides of the said separable connection; a second member detachably associated with the first named member and having four contact elements respectively arranged for affording electrical connections to the said four contact elements, the contact elements carried by each member being rigidly spaced and adapted to afford the said electrical connections by the attaching of one member to the other; and means associated with one of the two members for opening the said separable connection.

8. A meter terminal and testing appliance as per claim 7, in combination with a pair of conductors respectively carried by the two members and connected in series with each other by the attaching of one member to the other, and arranged for by-passing the load coil of the meter when so connected.

Signed at Chicago, Illinois, January 18th, 1922.

ARTHUR C. McWILLIAMS.
JEAN S. JENSON.